US012807472B2

(12) United States Patent
Burton et al.

(10) Patent No.: US 12,807,472 B2
(45) Date of Patent: Nov. 24, 2026

(54) APPARATUS FOR TRANSFER OF HIGH VISCOSITY FLUIDS

(71) Applicant: Limworks, LLC, Ludington, MI (US)

(72) Inventors: John E. Burton, Ludington, MI (US); Christopher J. Burton, Ludington, MI (US)

(73) Assignee: Limworks, LLC, Ludington, MI (US)

( * ) Notice: Subject to any disclaimer, the term of this patent is extended or adjusted under 35 U.S.C. 154(b) by 131 days.

(21) Appl. No.: 18/825,570

(22) Filed: Sep. 5, 2024

(65) Prior Publication Data

US 2025/0109009 A1 Apr. 3, 2025

Related U.S. Application Data

(60) Provisional application No. 63/541,985, filed on Oct. 2, 2023.

(51) Int. Cl.
*B67D 7/64* (2010.01)

(52) U.S. Cl.
CPC .................................... *B67D 7/64* (2013.01)

(58) Field of Classification Search
CPC ........ B67D 7/0227; B67D 7/645; B67D 7/64; B05C 11/10; F04B 23/028; F04B 15/02; F04B 53/16
See application file for complete search history.

(56) References Cited

U.S. PATENT DOCUMENTS 2,080,856 A 5/1937 Thomas
2,214,779 A * 9/1940 Sundholm ............... F16N 37/02 141/27
2,726,802 A * 12/1955 Jones ...................... F16N 37/02 222/391
4,483,375 A 11/1984 Martin
4,693,286 A 9/1987 Lock et al.
5,494,194 A * 2/1996 Topper ..................... A23G 9/28 222/386
6,131,766 A 10/2000 King et al.
(Continued)

FOREIGN PATENT DOCUMENTS

WO 20230192031 10/2023

*Primary Examiner* — Vishal Pancholi

(74) *Attorney, Agent, or Firm* — Warner Norcross + Judd LLP

(57) ABSTRACT

A fluid transfer apparatus for moving highly viscous material from a secondary container to a dispensing container. The fluid transfer apparatus includes a pressure chamber defining an internal space of sufficient size to enclose the secondary container. The fluid transfer apparatus includes a dispensing piston configured to extend into the mouth of the secondary container and sealingly engage with the inner wall surface of the dispensing piston. The fluid transfer apparatus includes a dispensing container seat configured to receive the dispensing container. A material outlet provides a material flow path from the interior of the secondary container through the dispensing piston to the interior of the dispensing container seated on the dispensing container seat. In use, increased pressure within the pressure chamber forces the secondary container onto the dispensing piston, thereby pressurizing the material in the secondary container causing it to flow through the material outlet into the dispensing container.

24 Claims, 10 Drawing Sheets

(56) References Cited

U.S. PATENT DOCUMENTS

| | | | | |
|---|---|---|---|---|
| 6,550,643 | B1 | 4/2003 | Foster et al. | |
| 11,952,168 | B2 * | 4/2024 | Bree .................. | B65D 21/0228 |
| 2019/0314858 | A1 | 10/2019 | Tasaka et al. | |
| 2019/0367352 | A1 | 12/2019 | Hausner et al. | |

* cited by examiner

DETAIL G
SCALE 1 : 2

SECTION E-E
SCALE 1 : 4

DETAIL A
SCALE 1 : 1

DETAIL B
SCALE 1 : 1

DETAIL C
SCALE 1 : 2

DETAIL D
SCALE 1 : 2

SECTION A-A
SCALE 1 : 4

DETAIL C
SCALE 1 : 2

APPARATUS FOR TRANSFER OF HIGH VISCOSITY FLUIDS

BACKGROUND OF THE INVENTION

The present invention relates to viscous fluid transfer equipment, and more particularly to apparatus for transferring viscous fluid material into a dispensing container, such as a cartridge, for dispensing.

Numerous higher viscosity fluids such as but not limited to liquid silicone rubber, adhesives, and grease are sold in bulk containers, such as drums, pails or large jars. Container pails come in sizes such as but not limited to 1, 2, 3.5, 5, 6 and 7 gallon. Some pails are metal and include plastic liners. Other pail containers are manufactured by conventional injection molding processes. While bulk container are suitable for storage, there are many applications in which the viscous fluid must be transferred to a secondary (often smaller) container for use. This transfer process can be difficult because higher viscosity fluids are often not pourable, difficult to clean and transfer from one container to another. A variety of systems have been developed for transferring viscous material from bulk storage containers to secondary containers, such as mix containers (when mixing is desired) or directly into dispensing containers (when non mixing or other processing is desired). For example, the apparatus for transferring viscous fluid disclosed in U.S. Provisional Application No. 63/352,685, entitled APPARATUS FOR IMPROVED TRANSFER AND STORAGE OF VISCOUS FLUIDS, filed by Limworks, LLC, on Jun. 16, 2022, is particularly well suited for use in making these types of transfers. These systems are intended to interface with bulk storage containers.

In many applications, there is a need to transfer the higher viscosity fluid from a bulk storage container to a smaller, secondary container, such as a mixing container, for intermediate processing. For example, there are a wide range of application in which it is necessary (or desirable) to combine the viscous material with one or more secondary materials, such as other viscous materials, colorants, accelerants, retardants, etc. The step of combining the viscous material with secondary materials is often carried out in a secondary container, such as a mixing bowl or other mixing container. Although existing systems provide relatively simple and effective transfer of viscous materials from bulk storage containers to secondary containers, they are generally not useful in moving viscous material from a secondary container, such as a mix bowl, to a dispensing container. This is typically because existing viscous material transfer systems are not configured to interface with mixing bowls and other secondary containers as supply containers.

Accordingly, there remains a need for a system capable of moving viscous materials from secondary containers, such as mixing bowls, into dispensing containers, such as dispensing cartridges.

SUMMARY OF THE INVENTION

The present invention provides a fluid transfer apparatus for transferring high viscosity fluid from a secondary container to a dispensing container. The secondary container may be a mixing bowl and the dispensing container may be a cartridge. The apparatus generally includes a pressure chamber, a dispensing piston that extends into the pressure chamber and a dispensing container seat situated outside the pressure chamber. In use, the secondary container containing the high viscosity material is positioned in the pressure chamber in operative engagement with the dispensing piston. The pressure in the pressure chamber is increased to increasingly force the secondary container onto the dispensing piston, thereby moving the material from the secondary container to the dispensing container.

In one embodiment, the pressure chamber includes a top plate, a circumferential wall and a bottom plate. The circumferential wall can be any material such as metal, glass or plastic to function. Clear or translucent plastic pipe may be used in some application to see status of the filling process. A first seal may be disposed between the plastic pipe and the top plate and a second seal may be disposed between the plastic pipe and the bottom plate. The seals may be O-ring seals.

In one embodiment, the pressure chamber includes a bottom door that can be opened and moved out of the way to allow the secondary container to be fitted up and onto the inner chamber, and then closed to enclose the secondary container within the pressure chamber. In one embodiment, the bottom plate includes a door that can be opened and closed to provide selective access to the interior of the pressure chamber.

In one embodiment, the dispensing piston is situated within the pressure chamber and has an interior end that is sized and shaped to fit into the mouth of the secondary container. The dispensing piston includes an external seal operatively engaged with the inner surface of the wall(s) of the secondary container, thereby allowing the dispensing piston to function as a piston with respect to interior of the secondary container. For example, in one embodiment, the secondary container may have a circular cross section and the interior end of the dispensing piston may have a corresponding circular shape that is encircled by a circular primary seal.

In some applications, the inner diameter of the secondary container varies along the height of the secondary container. For example, some secondary containers are formed using a molding process that involves the use of a mold that forms a circumferential wall with a draft angle. In such applications, the primary seal may be configured to provide sealing engagement with the inner surface of the circumferential wall throughout the range of inner diameters. In one example, the dispensing piston may be fitted with an enlarged foam rubber seal having an outer diameter when uncompressed that is substantially larger than the maximum inner diameter of the secondary container to provide an adequate seal even at the maximum inner diameter and an outer diameter when fully compressed that is at least as small as the minimum inner diameter of the secondary container to provide an adequate seal even at the minimum inner diameter. If desired, the interior end of the dispensing piston may define an annular recess or annular slot that receives the primary seal.

In one embodiment, the bottom end of dispensing piston is formed by a secondary container adapter that is configured to sealingly engage with the inner surface of the wall of the secondary container. The apparatus may include interchangeable secondary container adapters configured to interface with different secondary containers. For example, the apparatus may include interchangeable secondary adapters that have different outer diameters selected to interface with different secondary containers that have different inner diameters, and/or the interchangeable secondary adapters may have different peripheral shapes to operatively engage with secondary containers that have different cross-sectional shapes.

In one application, the dispensing piston may include a circumferential wall with a bottom end that is closed by the secondary container adapter. In such applications, the interior space defined by the circumferential wall may define an inner chamber capable of receiving all or a portion of the dispensing container. The secondary container adapter may have a stepped configuration with a neck that fits closely into the bottom end of the circumferential wall and a shoulder that exceeds the diameter of the circumferential wall to ensure proper disposition of the secondary container adapter. A seal, such as an O-ring seal, may be fitted between the outer diameter of the neck and the inner diameter of the circumferential wall.

In one embodiment, the dispensing container seat is disposed in the inner chamber in fluid communication with the interior of the pressure chamber. In one embodiment, a material outlet is provided to form a material flow path from the interior of the pressure chamber to the dispensing container seat. The material outlet may be situated in and extend through the inner end of dispensing piston. For example, in one embodiment, the material outlet is defined by the secondary container adapter.

In one embodiment, the material outlet is defined by a dispensing container adapter. The dispensing container adapter may be fitted into the secondary container adapter. The dispensing container adapter may have an engagement end that opens to the interior of the pressure chamber and a dispensing end that is configured to interface with the desired dispensing container. The apparatus may be provided with a variety of different dispensing container adapters with different engagement ends specially configured to interact with different types of dispensing containers.

In one embodiment, the dispensing end of the dispensing container adapter has external threading that is configured to threadedly engage with internal threading on the end of a dispensing cartridge. The dispensing container adapter may be fitted into a corresponding through-hole in the interior end of the dispensing piston and may have an outer shape that interlocks with the through-hole to prevent rotation of the cartridge adapter relative the dispensing piston.

In one embodiment, the apparatus includes one or more guide pins that help to shepherd motion of the secondary container and prevent the secondary container from canting or tilting with respect to the dispensing piston. In one embodiment, the guide pins are removably affixed to a top plate situated at the upper end of the pressure chamber. For example, the top plate may define a plurality of holes that are arranged in a radially symmetric pattern and are configured to receive the guide pins. The top plate may have a plurality of different hole patterns that allow mounting of the guide pins in different patterns to accommodate different secondary containers.

In embodiments in which the dispensing piston include a circumferential wall, the upper end of the circumferential wall may be received in a corresponding opening defined in the top plate. In one embodiment, the opening in the top plate is stepped to provide a stop that prevents the circumferential wall of the dispensing piston from moving completely through the top plate. In one embodiment, an O-ring is fitted between the outer diameter of the circumferential wall of the dispensing piston and the inner diameter of the opening.

In one embodiment, the apparatus is operatively coupled to a supply of pressurized air. The apparatus may include an air supply valve that allows the supply of air to be turned on and off by the operator, as desired. In one embodiment, the supply of pressurized air is an air compressor or a tank containing compressed air.

In one embodiment, the apparatus includes an air regulator that allows an operator to vary the pressure of the air introduced into the pressure chamber. In use, the operator may slowly increase the pressure of the air introduce into the pressure chamber until the pressure is sufficient to force the secondary container up over the dispensing piston, thereby causing the viscous material to move from the secondary container to the dispensing container.

In one embodiment, the pressure chamber includes a pressure release valve that will allow air to escape from the interior of the pressure chamber if a predetermined pressure is exceeded.

In one embodiment, the apparatus may include an accessory air supply that allows the supply of pressurized air to be used with any desired accessories. In one embodiment, the apparatus includes an air outlet to which a desired air powered accessory may be connected and an accessory valve that allows an operator to turn on and off the flow of air to the air outlet.

The current embodiments provide a relatively simple and highly effective apparatus for moving high viscosity material from a secondary container, such as a mixing bowl, to a dispensing container, such as a dispensing cartridge. The use of a pressure chamber surrounding the secondary container (rather than driving an internal piston) helps to prevent a significant pressure differential between the interior and exterior of the secondary container. This helps to prevent the wall of the secondary container from expanding outwardly by high pressure and therefore reduces the potential for seeping around the piston. The use of a dispensing piston that extends into the secondary container helps to prevent the secondary container from being damaged by the high pressure as those portions of the container that are subject to the pressure differential are supported internally by the viscous material and the primary seal. The remaining portions of the secondary container (e.g. the portion extending above the primary seal) are not subjected to a significant pressure differential. In those embodiments that include interchangeable secondary container adapters, the apparatus can be quickly changed over to work with different secondary containers. In those embodiments that include interchangeable dispensing container adapters, the apparatus can be quickly changed over to work with different dispensing containers. When incorporated, the pressure valve and pressure regulator facilitate operation by providing control over when and how much pressure is applied to the secondary container. In some applications, the dispensing piston is joined to the pressure chamber without any threading or other complex attachment structures that might be difficult to clean. Similarly, in some applications, various components of the dispensing piston may be joined without threading or other complex attachment structures that might be difficult to clean. In some applications, the pressure chamber may include guide pins that help to prevent the secondary container from canting or otherwise binding up on the dispensing piston. The pressure chamber may include different guide pin mounting features that allow the guide pins to be mounted in different patterns to accommodate different secondary containers.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 2:
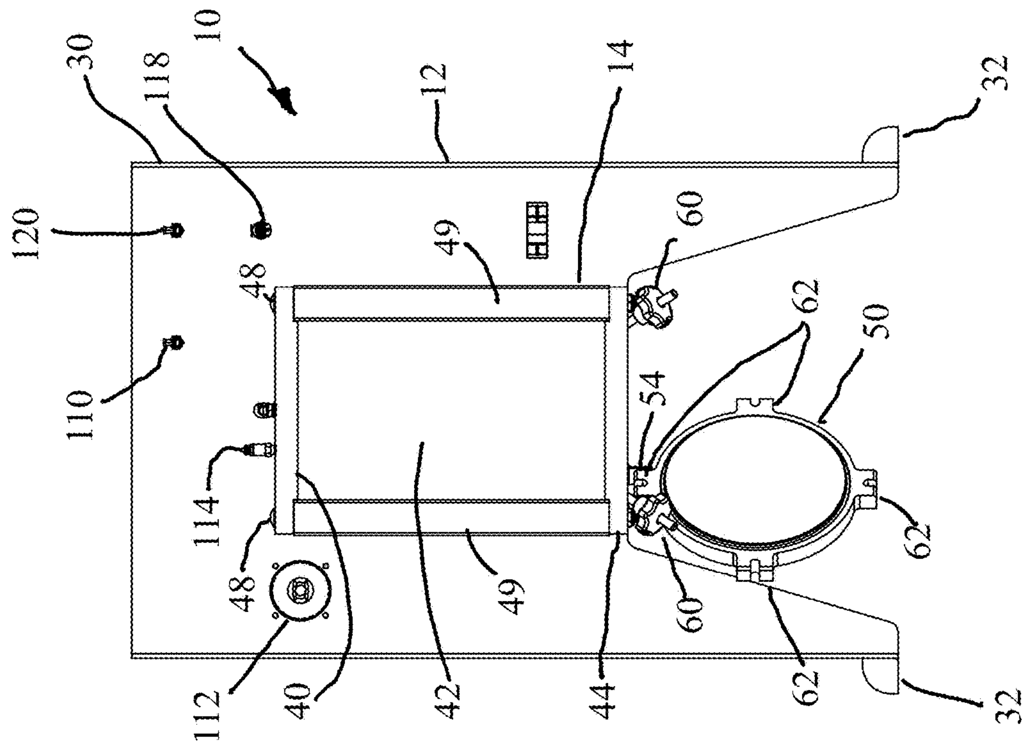
FIG. 2 is a front view of the apparatus.

A fluid transfer apparatus in accordance with an embodiment of the present invention is shown in FIGS. 1-7 and generally designated 10. The apparatus 10 generally includes a frame 12, a pressure chamber 14, a dispensing piston 16 and a dispensing container seat 18. The pressure chamber 14 provides an enclosed interior space 20 of sufficient size to accommodate a secondary container 200. The dispensing piston 16 extends into the interior space 20 and is configured to be operatively receive and seat the mouth 206 of the secondary container 200. The dispensing container seat 18 is disposed externally of the pressure chamber 14 and is configured to removably receive a dispensing container 202. A material outlet 22 extends through the dispensing piston 16 providing fluid communication between an interior face of the dispensing piston 16 and the dispensing container seat 18, whereby material is able to move from the interior of the secondary container 200 into the dispensing container 202. In operation, a secondary container 200 containing a highly viscous material 204 is positioned inside the pressure chamber 14 with its mouth 206 fitted over the inner end of the dispensing piston 16. Pressure is then selectively introduced into the pressure chamber 14 to create a pressure differential between the interior of the pressure chamber 14 and the material outlet 22. This pressure differential causes the secondary container 200 to move progressively up over the dispensing piston 16, thereby pressurizing the material 204 contained in the secondary container 200 and causing it to flow from the secondary container 200 to the dispensing container 202.

The present invention is described in the context of one exemplary fluid transfer apparatus that is intended for use in transferring high viscosity material from a secondary container, such as a mix bowl, to a dispensing container, such as a dispensing cartridge. In this disclosure, the term "secondary container" is intended to broadly encompass any of a wide range of containers that can be used to hold viscous materials, that can be fitted into a pressure chamber and that will properly interact with a dispensing piston as described and shown herein. Given the existing of alternative fluid transfer systems intended for us in moving material from bulk storage containers, the present invention is focused primarily (and not exclusively) on the movement of material, not from bulk storage containers, but rather from smaller containers in which a limited volume of material is contained, for example, mix bowls and other intermediate containers. Further, the present invention is focused primarily, but not exclusively, on moving material from secondary containers to dispensing containers of approximately the same size. For example, in typical applications, the entire contents of the secondary container will be moved into a single dispensing container. In other exemplary applications, the secondary container may contain enough material to fill more than one dispensing cartridge, such as two or three dispensing cartridges. It should be understood that the present invention can be implemented in a wide range of alternative embodiments. For example, and as discussed in more detail below, the frame 12, pressure chamber 14, the dispensing piston 16 and the dispensing container seat 18 can be implemented in a variety of different sizes, shapes and configurations to accommodate a host of different secondary containers and dispensing containers.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The present invention will now be described in more detail with reference to FIGS. 1-7. In this embodiment, the fluid transfer apparatus 10 is configured to move highly viscous material 204 from a secondary container 200, such a mix bowl, into a dispensing container 202, such as a dispensing cartridge (See FIGS. 4 and 7). The mix bowl 200 is generally bowl shaped container with a generally circular bottom wall and a circumferential wall extending upwardly from the periphery of the bottom wall. The inner diameter of the circumferential wall is generally uniform throughout the height of the mix bowl 200, but it might vary in some application, such as when the mix bowl is formed by injection molding and the mold includes a draft angle. The dispensing cartridge 202 is a generally conventional viscous material cartridge that has an internally threaded outlet on one end and includes an internal piston that can be moved toward the outlet end of the cartridge to force material out of the cartridge during end use. A variety of cartridges of this nature are commercially available. The present invention may be readily adapted for use with different secondary containers and/or different dispensing containers.

Figure 1:
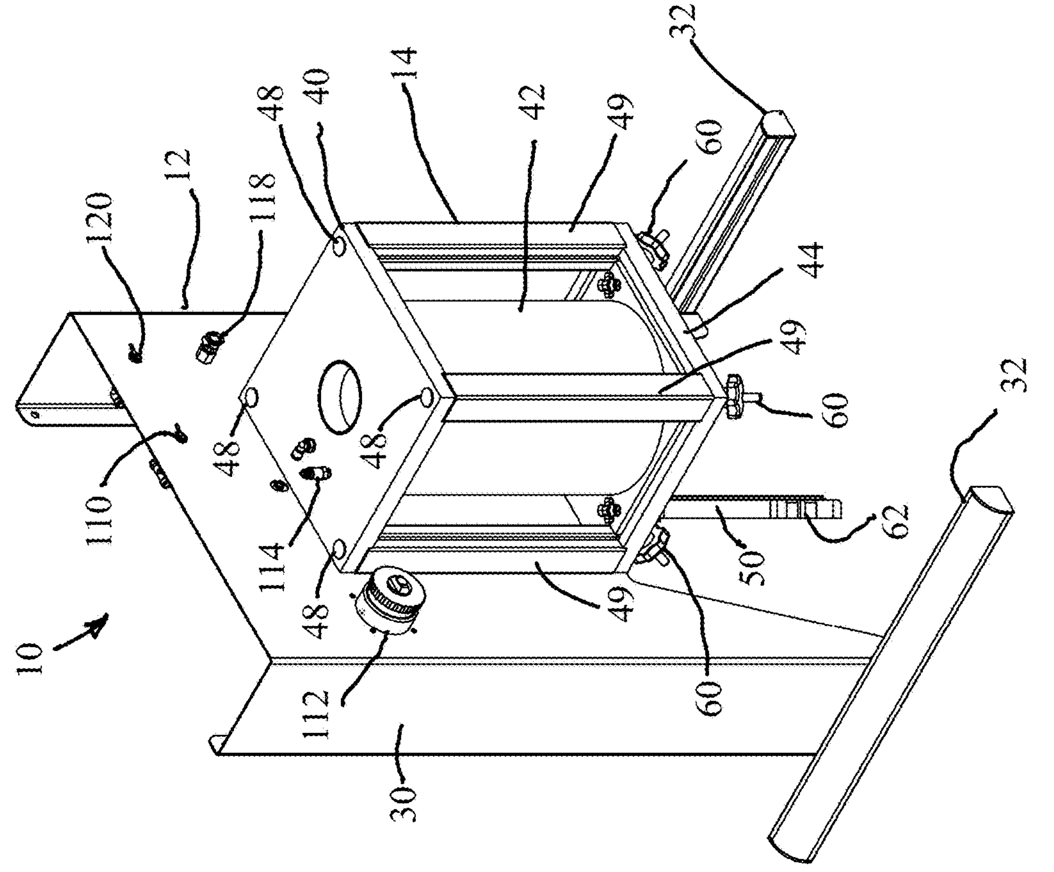
FIG. 1 is a perspective view of an apparatus in accordance with a current embodiment of the present invention.
Figure 3A:
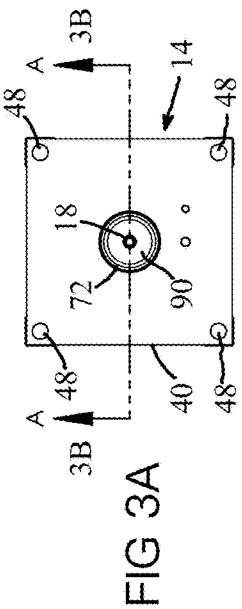
FIG. 3A is a top plan view of the apparatus with the frame removed.
Figure 3B:
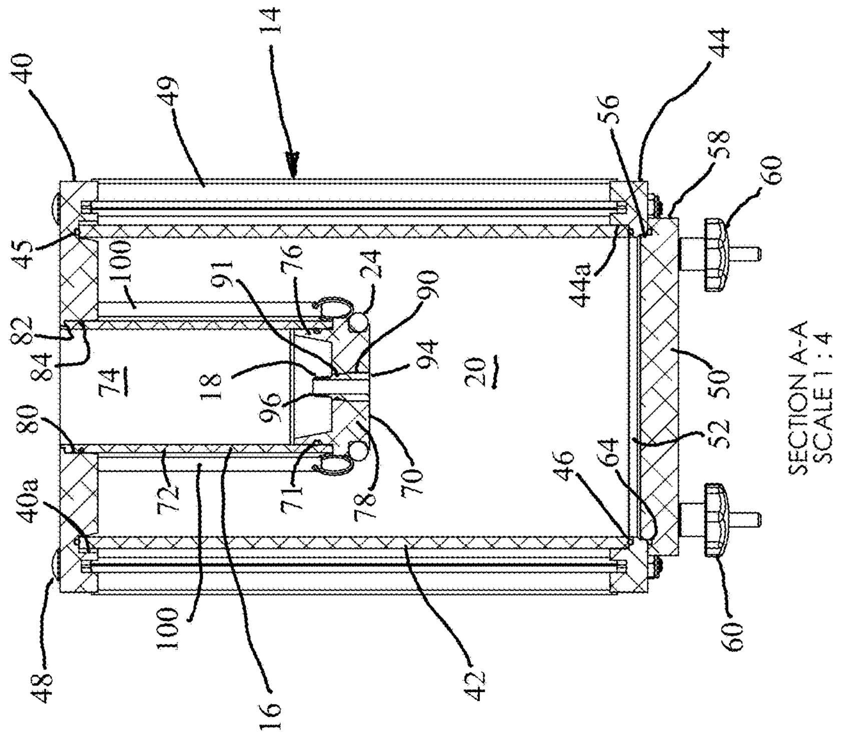
FIG. 3B is a sectional view of the taken along line 3B-3B of FIG. 3A.
Figure 5:
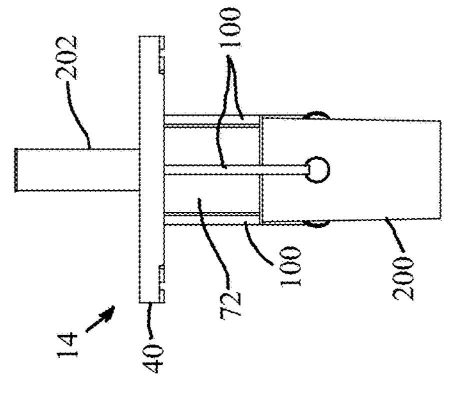
FIG. 5 is a front view of the apparatus shown in FIG. 4B with portions removed to show the interaction of the secondary container with the guide pins.

Referring now to FIGS. 1 and 3, the fluid transfer apparatus 10 generally includes a frame 12, a pressure chamber 14, a dispensing piston 16 and dispensing container seat 18. In this embodiment, the frame 12 is a structural assembly that is configured to sit upright and support the pressure chamber 14, the dispensing piston 16 and the dispensing container seat 18. The frame 12 generally includes an upright panel 30 that is supported upon a pair of elongated feet 32. As discussed in more detail below, various components associated with the supply of pressurized air to the pressure chamber 14 are also supported by the frame 10 in the illustrated embodiment. The size, shape and configuration of the frame 10 may vary from application to application.

The pressure chamber 14 defines an interior space 20 that is configured to enclose the secondary container 200 and can be selectively pressurized. The size, shape and configuration of the pressure chamber 14 may vary from application to application, for example, to accommodate different types of secondary containers and/or dispensing containers. In the illustrated embodiment, the pressure chamber 14 includes a top plate 40, a circumferential wall 42 and a bottom plate 44. The circumferential wall 42 can be any material such as metal, glass or plastic. The illustrated circumferential wall 42 is formed by a segment of plastic pipe. The plastic pipe may be transparent or translucent to allow an operator to see into the pressure chamber 14, which may facilitate operation. The specific material and wall thickness are selected to provide sufficient structure integrity to withstand anticipated internal pressures. In the illustrated embodiment, the circumferential wall 42 is manufactured from clear plastic, such as but not limited to PETG, PC or CAB with a wall thickness selected to withstand the pressure range desired. As shown in FIG. 3, the illustrated top plate 40 defines an inwardly-facing annular channel **40*a* that receives the top end of the circumferential wall 42 and the illustrated bottom plate includes an inwardly-facing annular shoulder 44*a* that receives the bottom end of the circumferential wall 42. In the illustrated embodiment, a first seal 45 is disposed between one end of the circumferential wall 42 and the top plate 40, and a second seal 46 disposed between the opposite end of the circumferential wall 42 and the bottom plate 44. The seals may be O-ring seals or other suitable seals. In the illustrated embodiment, the top plate 40 and the bottom plate 44 are joined by a plurality of carriage bolts 48 and corner supports 49 disposed outside the pressure chamber 14** in the four corners of the top and bottom plates.

To provide access to the interior space 20, the pressure chamber 14 may include a door. In the illustrated embodiment, a door 50 is provided in the bottom plate 44. In this position, the door 50 allows a secondary container 200 to be pushed up into the pressure chamber 14 onto the dispensing piston 16. In this embodiment, the bottom plate 44 defines a circular opening 52 and the door 50 is configured to selectively close the opening 52. To interface with the circular opening 52, the illustrated door 50 is generally disk-shaped with a stepped configuration including a neck 56 that is fitted into the opening 52 and a shoulder 58 that is configured to abut the outer surface of the bottom plate 44 around the opening 52. The door 50 is secured to the bottom plate 44 by a hinge 54 that allows the door 50 to swing down and away from the opening 52. In this embodiment, the hinge 54 is a loose hinge that allows the door 50 to move downwardly a sufficient distance for the neck 56 to disengage from the opening 52 before it is swung out of the way. In the illustrated embodiment, the door 50 is secured in the closed position by a plurality of free-swinging eyebolts and knob nuts 60 that are configured to selectively engage with corresponding slotted tabs 62 protruding from the peripheral edge of the door 50. As perhaps best shown in FIG. 1, the eyebolts 60 extend through the bottom plate 44 outside the periphery of the circumferential wall 42 and consequently outside the interior space 20 of the pressure chamber 14 where it is unnecessary to seal the interface between the eyebolts and the bottom plate 44. In this embodiment, an O-ring seal 64 is fitted to the shoulder 58 to engage with the bottom plate 44 and provide a leaktight seal. The size, shape and configuration of the door may vary from application to application. The size, shape and configuration of the door 50 may vary from application to application.

As discussed above, the apparatus includes a dispensing piston 16 that extends into the interior space 20 and operatively interacts with the secondary container 200 to move material 204 from the secondary container 200 to the dispensing container 202. In the illustrated embodiment, the dispensing piston 16 is sized and shaped to fit into the mouth of the secondary container 200 and to travel the full depth of the secondary container 200. The inner end of the dispensing piston 16 includes an external primary seal 24 that operatively (e.g. sealingly) engages with the inner surface of the wall(s) of the secondary container 200 when the secondary container 200 is seated on the dispensing piston 16. The primary seal 24 allows the inner end of the dispensing piston 16 to function as a piston with respect to interior of the secondary container 200. As shown, the dispensing piston 16 is of sufficient height to allow the dispensing piston 16 to extend into the full depth of the secondary container 200 with the inner end of the dispensing piston 16 engaging the bottom wall of the secondary container 200. This helps to ensure optimal displacement of the material 204 from the secondary container 200.

In the illustrated embodiment, the dispensing piston 16 is designed to interface with a secondary container 200 that is in the form of a generally conventional mixing bowl having a circular cross-section (See FIGS. 4-7). Accordingly, the illustrated dispensing piston 16 has an inner end with a circular peripheral shape and an outer diameter slightly smaller than the inner diameter of the secondary container 200. The primary seal 24 is fitted about the inner end of the dispensing piston 16 and has an outer diameter greater than the inner diameter of the secondary container 200 so that the primary seal 24 provides a leaktight seal between the inner end of the dispensing piston 16 and the inner wall of the secondary container 200. In the illustrated embodiment, the interior end of the dispensing piston may define an annular recess or annular slot configured to receive the primary seal 24. In some applications, the inner diameter of the secondary container may vary along the height of the secondary container. For example, some secondary containers are formed using a molding process that involves the use of a mold that forms a circumferential wall with a draft angle. In such applications, the primary seal may be configured to provide sealing engagement with the inner surface of the circumferential wall throughout the full range of inner diameters. For example, the dispensing piston may be fitted with an enlarged foam rubber seal having an outer diameter when uncompressed that is substantially larger than the maximum inner diameter of the secondary container so that it provides an adequate seal against the secondary container even at the maximum inner diameter and an outer diameter when fully compressed that is at least as small as the minimum inner diameter of the secondary container so that the primary seal provides an adequate seal against the secondary container even at the minimum inner diameter.

In the illustrated embodiment, the inner end of dispensing piston 16 is formed by a secondary container adapter 70 that is configured to sealingly engage with the inner surface of the circumferential wall of the secondary container 200. In some applications, the apparatus 10 may include interchangeable secondary container adapters configured to interface with different secondary containers. For example, the apparatus 10 may include a plurality of interchangeable secondary adapters 70 that have different outer diameters selected to interface with different secondary containers that have different inner diameters, and/or the interchangeable secondary adapters may have different peripheral shapes to operatively engage with secondary containers that have different cross-sectional shapes.

Referring now to FIG. 3, the illustrated dispensing piston 16 may include a circumferential wall 72 having a top end that is received is a corresponding seat in the top plate 40 and a bottom end that is closed by the secondary container adapter 70. The circumferential wall 72 can be any material such as metal, glass or plastic. The circumferential wall 72 may be manufactured from a section of plastic pipe. The plastic pipe may be transparent or translucent, if desired. The specific material and wall thickness of the plastic pipe are selected to provide sufficient structure integrity to withstand anticipated internal pressures in the pressure chamber 14. In the illustrated embodiment, the circumferential wall 72 of the dispensing piston 16 is manufactured from clear plastic, such as but not limited to PETG, PC or CAB with a wall thickness selected to withstand the pressure range desired. In this embodiment, the top plate 40 includes a stepped opening 80 with a shoulder 82 that prevents the circumferential wall from passing entirely through the top plate 40 (See FIG. 3). A seal, such as an O-ring 84, is fitted around the upper end of the circumferential wall 72 to provide a leaktight seal between the circumferential wall 72 and the top plate 40.

In the illustrated embodiment, the secondary container adapter 70 is coupled to the bottom end of the circumferential wall 72. As shown, the illustrated secondary container adapter 70 is generally disk-shaped and has a stepped configuration with a neck 76 that fits closely into the bottom end of the circumferential wall 72 and a shoulder portion 78 that exceeds the diameter of the circumferential wall 72 to provide a surface that abuts the bottom end of the circumferential wall 72 to help ensure proper disposition of the secondary container adapter 70 relative to the circumferential wall 72. In this embodiment, a seal, such as an O-ring 71, is fitted between the outer diameter of the neck 76 and the inner diameter of the circumferential wall 72. In this embodiment, the shape of the periphery of the shoulder portion 78 corresponds with the cross-sectional shape of the secondary container 200 with sufficient clearance for the secondary container adapter 70 to move within the secondary container 200 while allowing the primary seal 24 to provides an effective seal.

As noted above, the fluid transfer apparatus 10 includes a dispensing container seat 18 capable of receiving the dispensing container 202 into which material 204 is to be transferred. In this embodiment, the dispensing container seat 18 is disposed on the top of the secondary container adapter 70 within the interior space 74 defined by the circumferential wall 72. The size and shape of the interior space 74 may be varied to in alternative applications to accommodate dispensing containers of different shapes and sizes. In the illustrated embodiment, the dispensing container seat 18 is formed by a dispensing container adapter 90 (or cartridge adapter) that is seated in and protrudes from the secondary container adapter 70. More specifically, the secondary container adapter 70 of the illustrated embodiment defines a through-hole and the dispensing container adapter 90 is seated in the through-hole. The through-hole and dispensing container adapter 90 are, in the illustrated embodiment, tapered or otherwise shaped to prevent the dispensing container adapter 90 from passing entirely through the secondary container adapter 70. Further, the through-hole and the exterior surface of the dispensing container adapter 90 may be shaped to prevent rotation of the dispensing container adapter 90 relative to the secondary container adapter 70. For example, in one embodiment, at least a portion of the through-hole and a correspondence portion of the dispensing container adapter 90 may be hexagonal in cross-section and the two hexagonal shapes may be closely interfitted to prevent rotation when the dispensing container adapter 90 is properly seated in the through-hole. A seal, such as an O-ring 91 may be fitted about the dispensing container adapter 90 to provide a leaktight seal between the secondary container adapter 70 and the dispensing container adapter 90.

In the illustrated embodiment, the dispensing container adapter 90 has an engagement end 94 that is disposed in communication with the interior space 20 and a dispensing end 96 that is configured to interface with the dispensing container 202 and forms at least a portion of the dispensing container seat 18. In this embodiment, the dispensing end 96 is externally threaded to mate with the internal threads on the dispensing container 202. The size, shape and configuration of the dispensing end 96 may be varied from application to application to interface with different types of dispensing containers. If desired, a plurality of interchangeable dispensing container adapters may be provided that are specially configured to interface with a variety of different dispensing containers.

In the illustrated embodiment, the dispensing container adapter 90 defines a material outlet 22 that extends from the interior of the pressure chamber 14 to the exterior of the pressure chamber 14 at the dispensing container seat 18. As such, the material outlet 22 defines a flow path through which pressurized viscous material 204 contained in the secondary container 200 can move into the lower pressure interior of the dispensing container 202.

Figure 6:
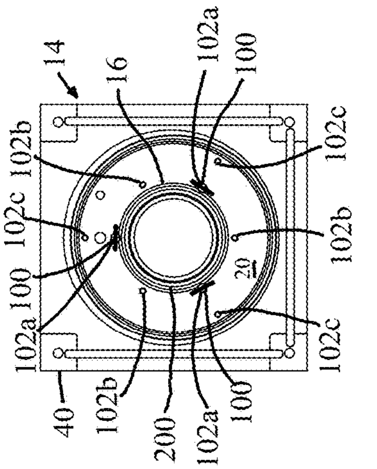
Figure 4A:
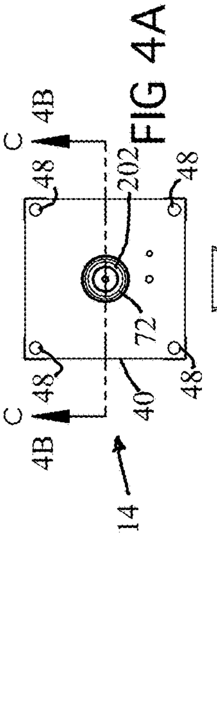
FIG. 4A is a top plan view of the apparatus with the frame removed.
Figure 4B:
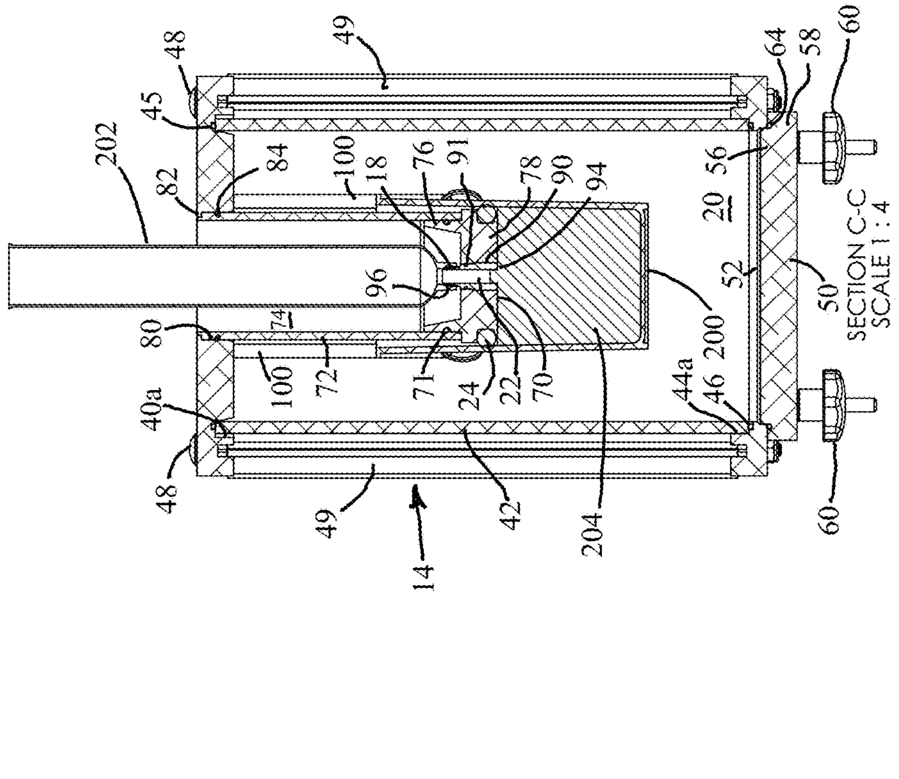
FIG. 4B is a sectional view of the apparatus taken along line 4B-4B of FIG. 4A showing a secondary container and a dispensing container in position to begin the transfer of viscous material from the secondary container to the dispensing container.
Figure 7A:
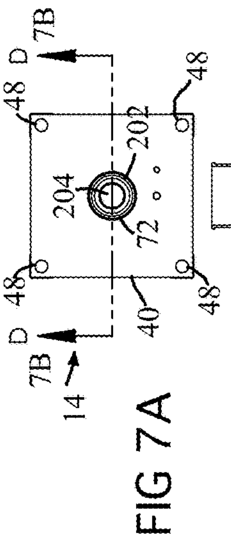
FIG. 7A is a top plan view of the apparatus with the frame removed.
Figure 7B:
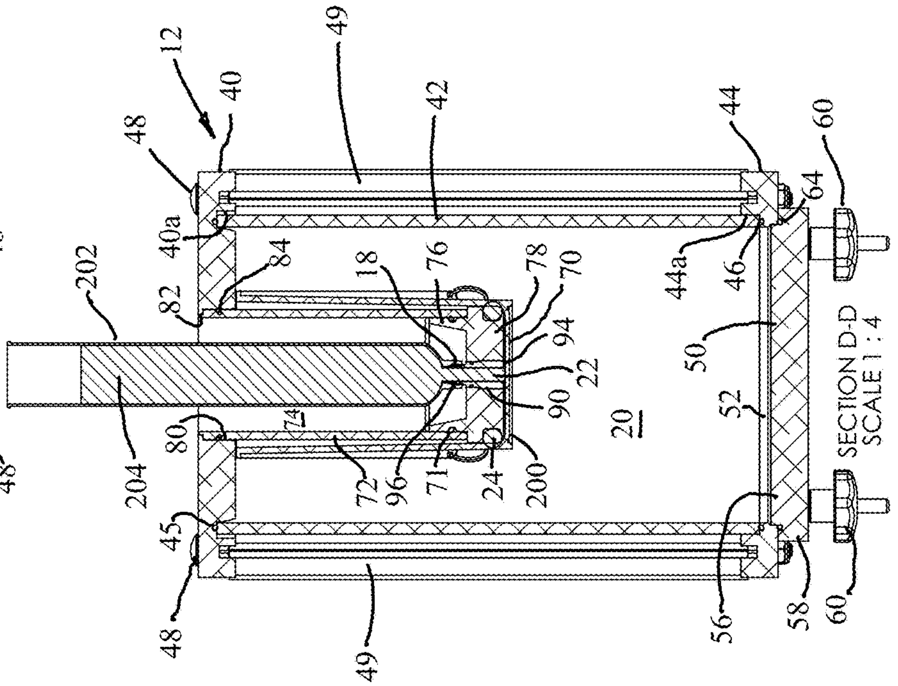
FIG. 7B is a sectional view of the apparatus taken along line 7B-7B of FIG. 7A showing the apparatus after the material has been moved from the secondary container to the dispensing container.

If desired, the fluid transfer apparatus 10 may include structure intended to help retain proper alignment between the secondary container 200 and the dispensing piston 16. In the illustrated embodiment, the apparatus 10 includes a plurality of guide pins 100 that help to prevent the secondary container 200 from canting or tilting with respect to the dispensing piston 16. In this embodiment, the apparatus 10 includes three guide pins 100 that are removably affixed to a top plate 40 in spaced relation to the dispensing piston 16. For example, the top plate 40 may define a plurality of holes 102*a* that are arranged in a radially symmetric pattern and are configured to receive the guide pins 100. Each of the guide pins 100 may have a spring-loaded ball bearing (not shown) at the top end that is fitted into a guide pin hole 102 to help removably secure the guide pin 100 to the top plate 40. The guide pins 100 may be secured to the top plate 40 using other conventional attachments. Each guide pin 100 may also include a ring at the bottom end to facilitate removal from the top plate 40. In the illustrated embodiment, the guide pins 100 are position to guide movement of the secondary container 200 as the secondary container 200 travels relative to the dispensing piston 16. More specifically, the guide pins 100 are arranged in a radially symmetric pattern parallel to and at a radius slightly greater than the outer diameter of the secondary container 200. To facilitate use of the guide pins 100 with different secondary containers 200, the top plate 40 may have a plurality of different hole patterns that allow mounting of the guide pins 100 in different patterns to accommodate different secondary containers. For example, as shown in FIG. 6, the top plate 40 may include three different sets of guide pins holes 102*a*, 102*b* and 102*c* in which the guide pins 100 can be interchangeably seated to accommodate secondary containers with three different outer diameters.

In the illustrated embodiment, the fluid transfer apparatus 10 is operatively coupled to a supply of pressurized air (not shown). The supply of pressurized air may be essentially any source of pressurized air, such as an air compressor or a tank containing compressed air. The illustrated apparatus 10 includes an air supply valve 110 that allows the supply of air to be turned on and off by the operator, as desired. In this embodiment, the apparatus 10 also includes an air regulator 112 that allows an operator to vary the pressure of the air introduced into the pressure chamber 14. In use, the operator may manipulate the air pressure regulator 112 to slowly increase the pressure of the air introduce into the pressure chamber 14 until the pressure is sufficient to force the secondary container 200 up over the dispensing piston 16, thereby causing the viscous material to move from the secondary container 200 through the material outlet 22 and the dispensing container adapter 90 into the dispensing container 202. The pressure required to transfer fluid from the secondary container 200 to the dispensing container 202 may vary from application to application depending on various factors, such as the viscosity of the material 204 and the size, shape and length of the material outlet 22. With certain lower viscosity materials, operating pressure may be in the range of 20-30 psi, while certain higher viscosity materials may require operating pressure in the range of 60-70 psi. In other applications, higher or lower operating pressures may be suitable.

As perhaps best shown in FIG. 1, the fluid transfer apparatus 10 of the illustrated embodiment includes a pressure release valve 114 mounted through the top plate 40 to allow air to exhaust from the pressure chamber 12 if the air pressure in the interior space 20 exceeds the threshold of the pressure release valve 114.

In the illustrated embodiment, the fluid transfer apparatus 10 also includes an accessory air supply that allows the supply of pressurized air to be used with essentially any desired accessories. The illustrated apparatus 10 includes an air outlet 118 to which a desired air powered accessory may be connected and an accessory valve 120 that allows an operator to turn on and off the flow of air to the air outlet 118.

In the illustrated embodiment, various components are installed without the use of threads or other complex attachments structures. For example, the circumferential wall 72 is fitted into the opening 80 in the top plate 40 and retained by frictional interaction created by O-ring 84. As another example, the secondary container adapter 70 is fitted into the opening in the bottom end of the circumferential wall 72 and retained by frictional interaction created by O-ring 71. Similarly, the dispensing container adapter 90 is fitted into the secondary container adapter 70 and retained by frictional interaction created by O-ring 91. As a result, the components can be easily disassembled and cleaned when desired.

Figure 8C:
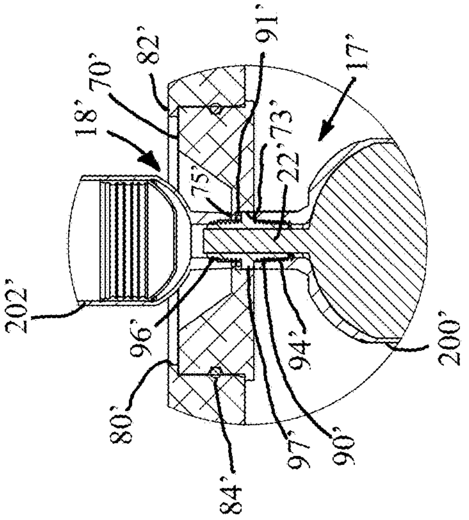
FIG. 8C is an enlarged view of Area 8C of FIG. 8B.
Figure 8A:
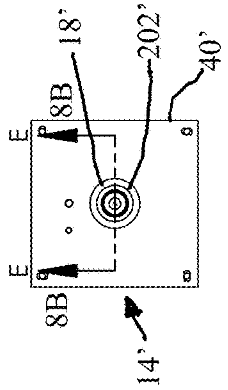
FIG. 8A is a top plan view of the alternative apparatus with the frame removed.
Figure 8B:
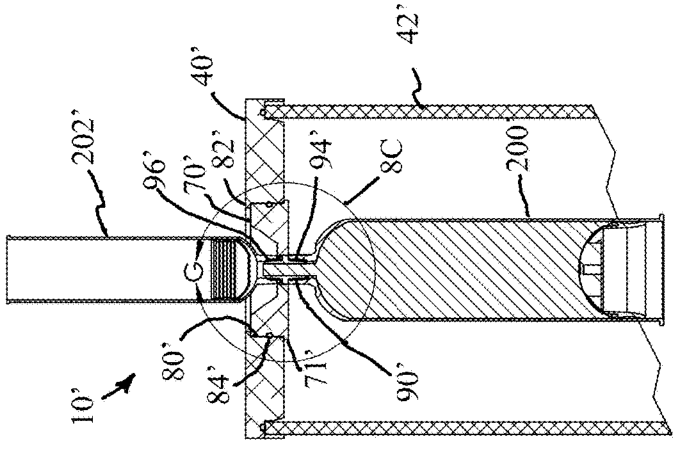
FIG. 8B is a sectional view of the alternative apparatus taken along line 8B-8B of FIG. 8A showing the apparatus with the material in the secondary container prepared for transfer to the dispensing container.

An alternative embodiment of the fluid transfer apparatus 10' is shown in FIGS. 8A-8C. Fluid transfer apparatus 10' is generally identical to fluid transfer apparatus 10, except as shown and described. Reference numerals shown in FIGS. 8A-8C, but not used in the written description, identify like-numbered components (excluding the prime ("'") symbol) described in connection with FIGS. 1-7B. In this embodiment, the fluid transfer apparatus 10' is configured to work with secondary containers 200' (e.g. cartridges) that include an internal piston that can be moved to force material 204' from within the secondary container 200'. In this embodiment, there is no dispensing piston. Instead, the apparatus 10' include an outer adapter 70' that interfaces with the top plate 40' in place of the dispensing piston shown and described above in connection with fluid transfer apparatus 10. More specifically, the outer adapter 70' is removably fitted into the opening 80' in the top plate 40'. The upper end (or outer end) of the outer adapter 70' may abut the shoulder 82'. Further, the outer adapter 70' may include a peripheral lip 71' that abuts the lower surface of the top plate 40'. A seal, such as O-ring 84', may be fitted between the outer adapter 70' and the wall defining the opening 80' to provide a leaktight interface between the two. The outer adapter 70' defines a through hole 73'. In this embodiment, the through hole 73' has a stepped configuration with an inner shoulder 75'.

The fluid transfer apparatus 10' of FIGS. 8A-8C includes a secondary container seat 17' and a dispensing container seat 18' that allow a secondary container 200' and a dispensing container 202' to be operatively coupled together via a flow path that allows material 204' to flow from the interior of the secondary container 200' to the interior of the dispensing container 202'. To facilitate use with different secondary containers and/or dispensing containers, the fluid transfer apparatus 10' includes a dispensing adapter 90' fitted into the outer adapter 70'. The dispensing adapter 90' generally includes an inner end 94', an outer end 96' and a central shoulder 97'. The inner end 96' is configured to interface with the secondary container 200' and the outer end 96' is configured to interface with the dispensing container 202'. As such, the dispensing adapter 90' forms at least a portion of the secondary container seat 17' and at least a portion of the dispensing container seat 18'. In this embodiment, the dispensing adapter 90' defines a material outlet 22' extending from the inner end 94' to the outer end 96' to provide the material flow path from the secondary container seat 17' and the dispensing container seat 18'.

In the illustrated embodiment, the dispensing adapter 90' is disposed in through hole 73' with the inner end 94' situated inside the pressure chamber 14' and outer end 96' disposed outside the pressure chamber 14'. The central shoulder 97' engages with the annual shoulder 75' in through hole 73' to retain the dispensing adapter 90'. A seal, such as O-ring 91', is sandwiched between the central shoulder 97' and the inner shoulder 75' to provide a leaktight seal therebetween.

As perhaps best shown in FIG. 8C, the illustrated dispensing adapter 90' includes an inner end 94' that is configured to adjoin with the secondary container 200' (which in the illustrated embodiment is a generally conventional cartridge with internal piston). In this embodiment, the secondary container 200' includes an internally threaded outlet and the inner end 94' is externally threaded with corresponding threads to facilitate threaded interconnection between the secondary container 200' and inner end 94'. In alternative embodiments, the inner end may be varied to work with essentially any desired secondary container attachment, such as, but not limited to, barber fittings, bayonet fittings, quarter-turn fittings, snap lock fittings, friction fittings, compression fittings and Luer lock fittings. By way of example and not by limitation, the dispensing adapter may, in alternative embodiments, be configured to interface with the mixing cup with extrusion plunger shown in U.S. Pat. No. 11,383,212 to LaRose et al, which includes a wide mouth that it externally threaded.

As noted above, the illustrated dispensing adapter 90' includes an outer end 96' that is configured to adjoin with the dispensing container 202' (which in the illustrated embodiment is a generally conventional cartridge with internal piston). In this embodiment, the dispensing container 202' includes an internally threaded outlet and the outer end 96' is externally threaded with corresponding threads to facilitate threaded interconnection between the dispensing container 202' and outer end 96'. In alternative embodiments, the outer end may be varied to work with essentially any desired dispensing container attachment, such as, but not limited to, barber fittings, bayonet fittings, quarter-turn fittings, snap lock fittings, friction fittings, compression fittings and Luer lock fittings.

In the illustrated embodiment, the apparatus 10' includes an outer adapter 70' into which the dispensing adapter 90' is seated. This may allow the fluid transfer apparatus 10 of FIGS. 1-7B to be readily converted for use with secondary containers that have an integrated piston. However, in alternative embodiments, the outer adapter may be eliminated and the dispensing adapter 90' may be fitted into an opening in the top plate 40' (or other portion of the wall of the pressure chamber).

In use, when the interior of the pressure chamber 14' is pressurized, the pressure acts on the piston seated inside the secondary container 200', thereby causing the piston to move in turn driving the material 204' from the interior of the secondary container 200' through the dispensing adapter 90' and into the dispensing container.

Figure 9B:
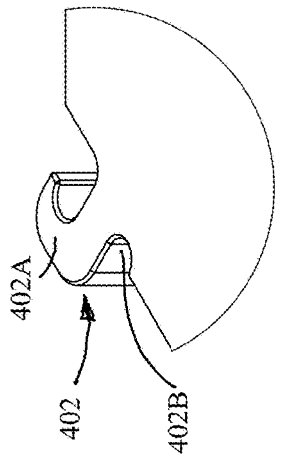
FIG. 9B is an enlarged view of Area 9B of FIG. 9A.
Figure 9C:
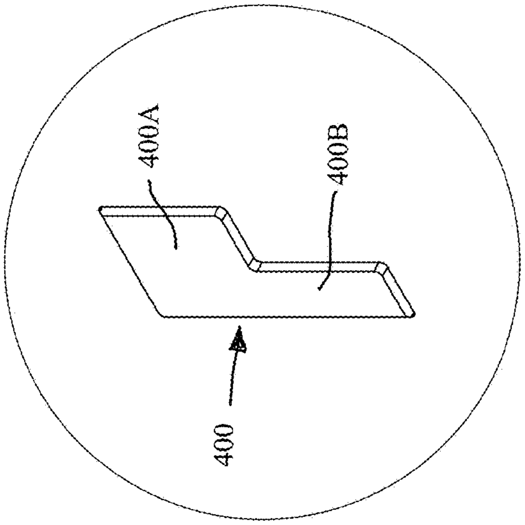
FIG. 9C is an enlarged view of Area 9C of FIG. 9A.
Figure 9A:
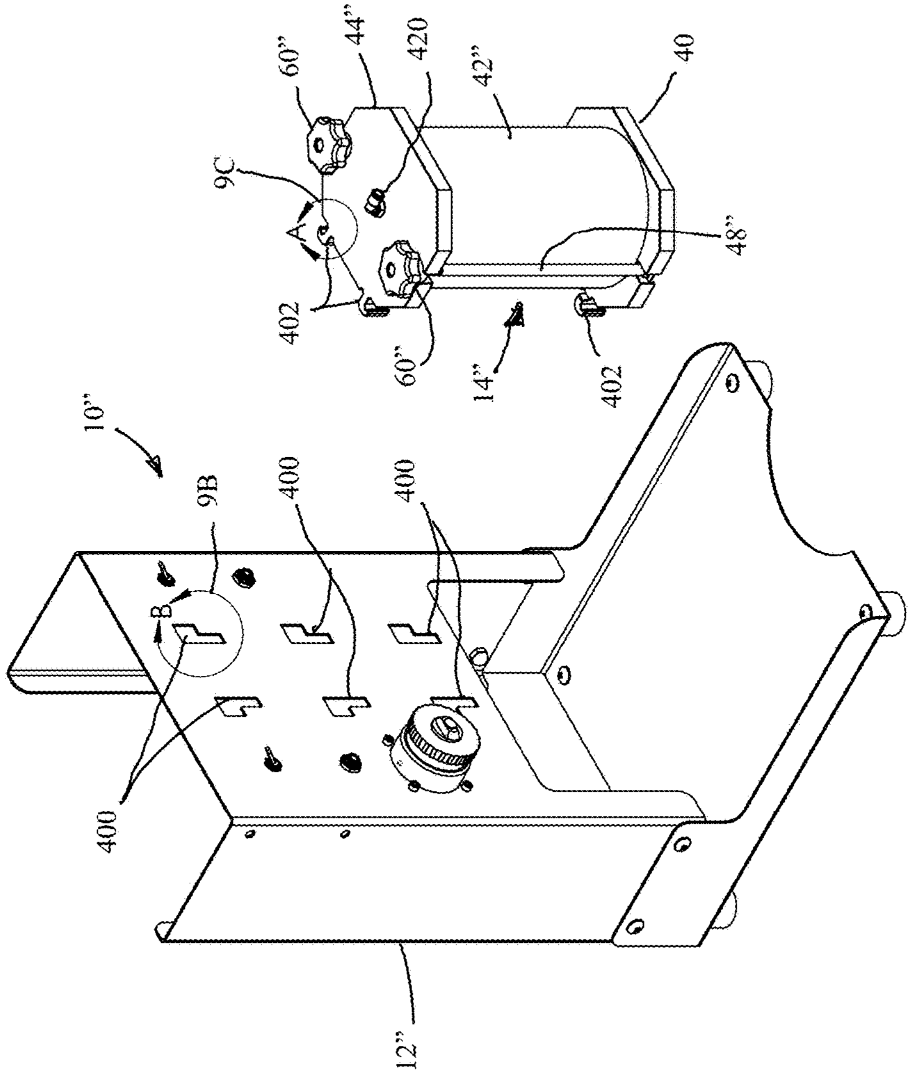
FIG. 9A is a perspective partially exploded view of an alternative embodiment of the present invention.

Another fluid transfer apparatus 10" in accordance with an alternative embodiment of the present invention is shown in FIG. 9A through FIG. 14. This alternative embodiment is generally identical to the embodiments described above except to the extent described and shown in the corresponding drawings. Referring now to FIGS. 9A-9C, the alternative embodiment 10" generally includes a frame 12", a pressure chamber 14", a dispensing piston 16" and a dispensing container seat 18".

Figure 11:
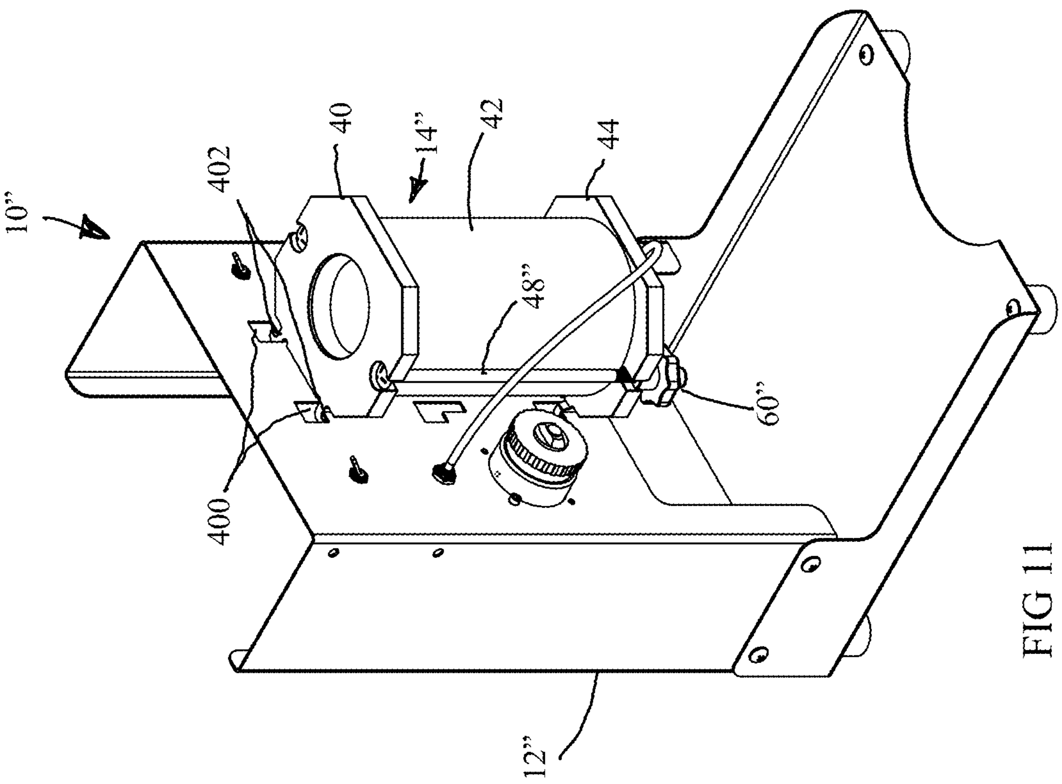
FIG. 11 is a perspective partially exploded view of the pressure chamber of the embodiment of FIG. 9A oriented in an inverted position.
Figure 10:
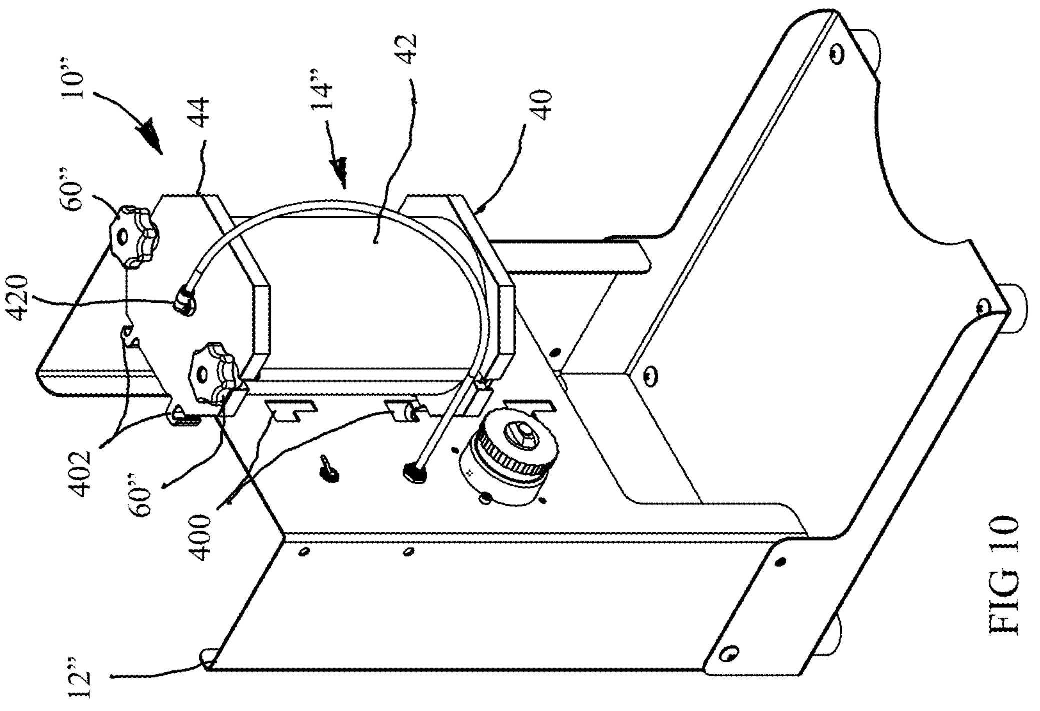
FIG. 10 is a perspective partially exploded view of the pressure chamber of the embodiment of FIG. 9A oriented in an upright position.

In this embodiment, the pressure chamber 14" is configured to mount to the frame 12" by a keyhole slot arrangement (See FIG. 9A). As shown, the pressure chamber 14" and frame 12" include an arrangement of slots and hooks that allow the pressure chamber 14" to be easily and securely attached to and removed from the frame 12". In the illustrated embodiment, the slots 400 are defined in the frame 12" and the hooks 402 are incorporated into the pressure chamber 14". This arrangement may be reversed in alternative embodiments. As perhaps best shown in FIG. 9C. Each slot 400 includes an enlarged upper portion 400A that is of sufficient size to receive the head 402A of a hook 402 and a reduced lower portion 400B that is of sufficient size to receive the neck 402B of the hook 402. Through this configuration the hooks 402 can be selectively interlocked with the slots 400 by fitting into the heads 402A of the hooks 402 through the upper portions 400A of the slots 400, and then lowering the hooks 402 with the necks 402B of the hooks 402 received in the lower portions 400B of the slots 400, thereby mechanically interlocking the hooks 402 and the slots 400 to secure the pressure chamber 14" to the frame 12". In this embodiment, the hooks 402 and slots 400 are configured to provide a relatively close fit between the neck 402B of the hook 402 and the reduced lower portion 400B of the slot 400. In the illustrated embodiment, the frame 12" defines multiple sets of slots 400 that allow the pressure chamber 14" to be mounted at different heights and orientations. Referring to FIGS. 9A-C, the frame 12" defines a pair of upper slots 400, a pair of middle slots 400 and a pair of lower slots 400, and the pressure chamber 14" includes a first pair of hooks 402 on the top plate 40" and a second pair of hooks 402 on the bottom plate 44". The pressure chamber 14" may be mounted by fitting at least one pair of hooks 402 into at least one pair of slots 400. For example, FIG. 10 shows the pressure chamber 14" mounted by insertion of the lower hooks 402 into the middle slots 400. As another example, FIG. 11 shows the pressure chamber 14" mounted by insertion of the top plate hooks 402 into the lower slots 400 and the bottom plate hooks 402 into the upper slots 400. By comparing FIGS. 10 and 11, it can also be seen that the arrangement of slots and hooks is configured in a symmetrical manner to allow the pressure chamber 14" to be mounted to the frame 12" in an upright orientation (See FIG. 11) or an inverted orientation (See FIG. 10). By allowing upright and inverted installation of the pressure chamber 14", the system 10" can transfer fluid with the secondary container and dispensing container in upright or inverted orientations. The design and configuration of the illustrated hooks and slots arrangement is merely exemplary, and may, in alternative embodiments, include hooks and slot of different sizes, shapes and configurations. As an alternative to hooks and slots, the system may include other mechanical structures that allow the pressure chamber to be selectively attached to and removed from the frame, including without limitation through the use of other mechanical interlocking structures or through the use of fasteners.

The fluid transfer apparatus 10" of FIGS. 9A-14 includes an alternative pressure chamber 14" that differs from pressure chamber 14 and pressure chamber 14' as described and shown. Referring now to FIGS. 12A-D, pressure chamber 14" generally includes a top plate 40", a circumferential wall 42" and a bottom plate 44". In this embodiment, the pressure chamber 14" is configured to mounted in upright and inverted orientations (as discussed above) and the terms "top" and "bottom" are used as an expedient relative to the orientation of the pressure chamber 14" shown in FIGS. 12A-14, and not to limit the present invention to any particular orientation. As illustrated, the bottom plate 44", circumferential wall 42" and top plate 40" are secured by a pair of carriage bolts 48" (or other threaded rods). In this embodiment, the carriage bolts 48" extend through the top plate 40" and have threaded bottom ends that pass through and protrude from the bottom plate 44". A threaded knob 60" is threadedly fitted to the bottom end of each carriage bolt 48" to secure the assembly. As shown in FIGS. 12B and 12C, a leaktight seal is formed between the top plate 40" and the circumferential wall 42" by seal 45" and between the bottom plate 44" and the circumferential wall 42" by seal 46". In this embodiment, an air fitting 420 is installed in the bottom plate 44" to allow pressurized air to be introduced into the interior space 20". For example, the bottom plate 44" may include a threaded through-hole 422 and the fitting 420 may be threadedly installed in the through-hole 422.

Figure 12C:
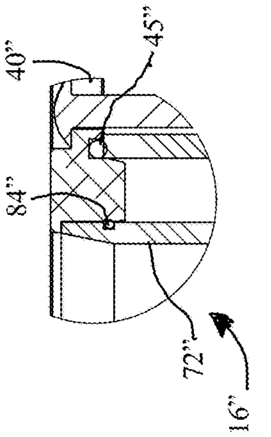
FIG. 12C is an enlarged view of Area 12C of FIG. 12B.
Figure 12D:
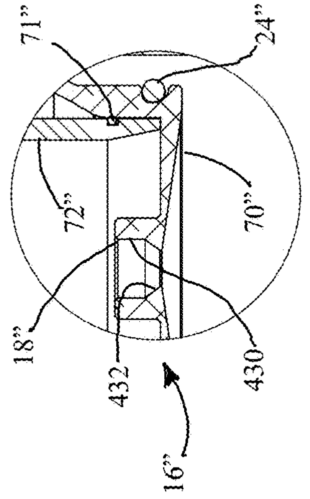
FIG. 12D is an enlarged view of Area 12D of FIG. 12B.
Figure 12A:
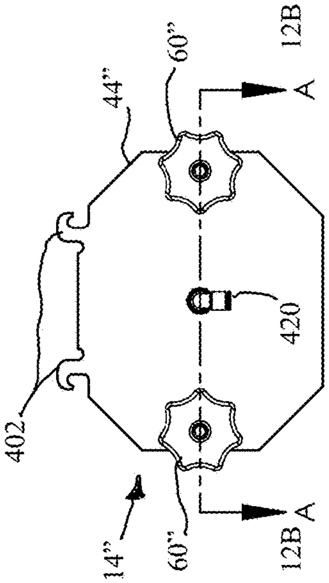
FIG. 12A is a bottom view of the pressure chamber of the embodiment of FIG. 9A.
Figure 12B:
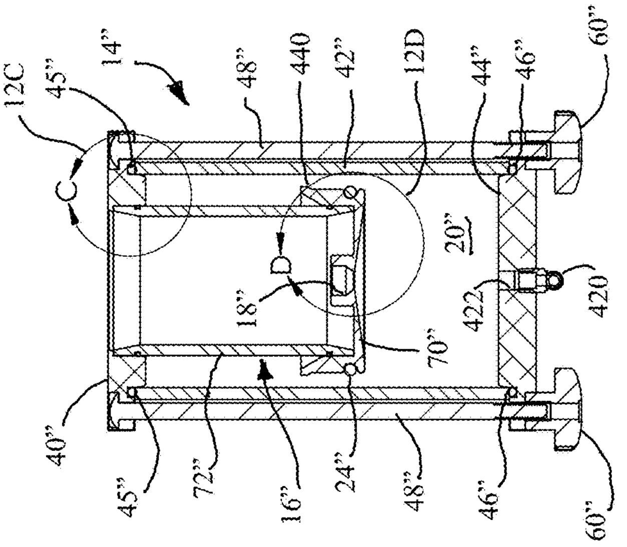
FIG. 12B is a sectional view of the pressure chamber taken along line 12B-12B of FIG. 12A.
Figure 13B:
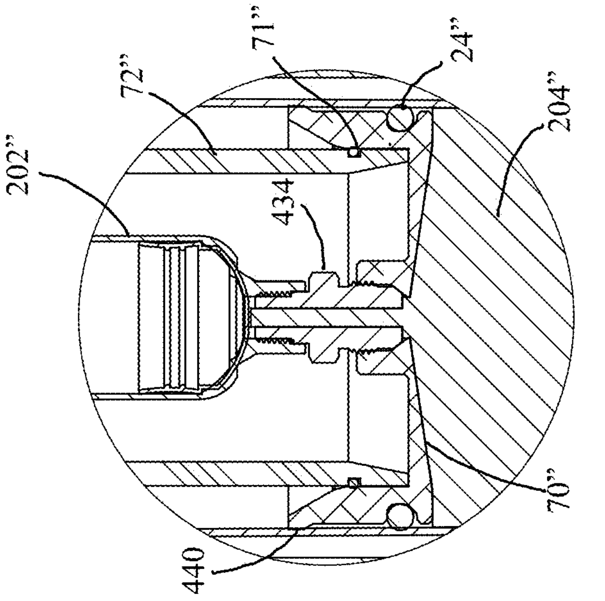
FIG. 13B is an enlarged view of Area 13B of FIG. 13A.
Figure 13A:
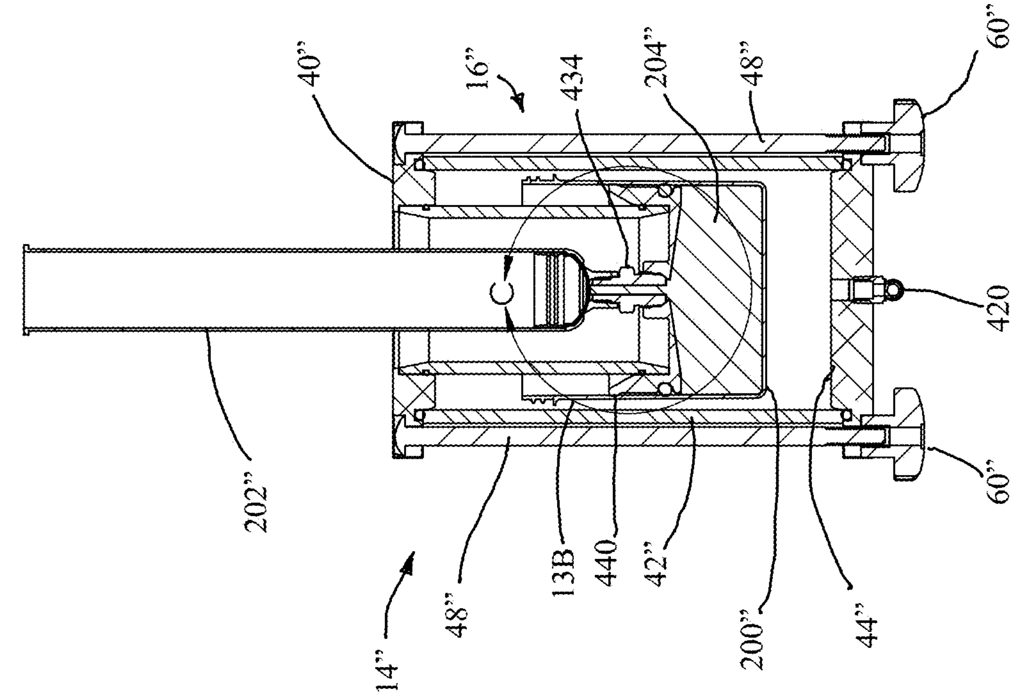
FIG. 13A is a sectional view of the pressure chamber similar to that of FIG. 12B showing an empty cartridge fitted to the dispensing piston.
Figure 14:
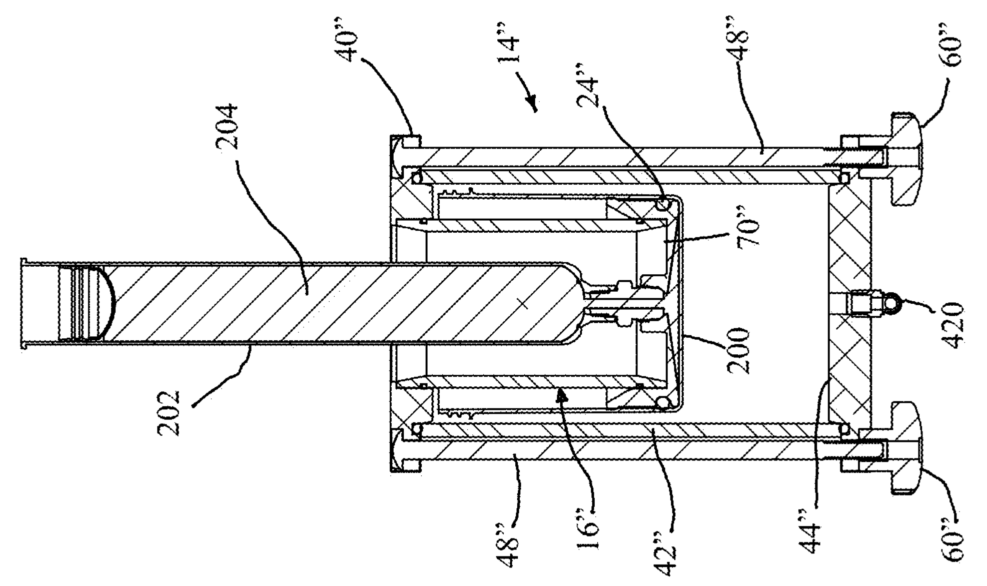
FIG. 14 is a sectional view of the pressure chamber similar to that of FIG. 13A showing a filled cartridge fitted to the dispensing piston.

As with the embodiments discussed above, the dispensing piston 16" extends into the interior space 20" to provide a structure capable of operatively interacting with the secondary container 200". Referring to FIG. 12B, the dispensing piston 16" includes a circumferential wall 72" that is closed by a piston 70" (or secondary container adapter). As shown in FIGS. 12B-C, a leaktight seal is formed between the top plate 40" and the circumferential wall 72" of the dispensing piston 16" by seal 84" and between the piston 70" and the circumferential wall 72" by seal 71". The piston 70" includes an external primary seal 24" that operatively (e.g. sealingly) engages with the inner surface of the wall(s) of the secondary container 200" when the secondary container 200" is seated on the dispensing piston 16". The primary seal 24" allows the inner end of the dispensing piston 16" to function as a piston with respect to interior of the secondary container 200". As shown in FIG. 14, the dispensing piston 16" is of sufficient height to allow the dispensing piston 16" to extend into the full depth of the secondary container 200" with the inner end of the dispensing piston 16" engaging the bottom wall of the secondary container 200". This helps to ensure optimal displacement of the material from the secondary container 200". The piston 70" defines central through-hole 430 through which material can pass from the secondary container 200" to the dispensing container 202". In this embodiment, the through-hole 430 is threaded and includes a conical seat 432 (See FIG. 12D). A fitting 434 is threadedly installed in the through-hole 430 as shown in FIGS. 13A and 13B. The fitting 434 has a conical end that engages with the conical seat 432 to provide a leaktight engagement without the need for an o-ring or any other type of seal. The illustrated fitting is a JIC to NPT fitting, but different fittings can be installed to work with different dispensing containers. In this embodiment, the piston 70" also includes a guide ring 440 that extends circumferentially about the piston 70" in spaced relation to the primary seal 24". For example, as shown in FIG. 12B, the guide ring 440 is disposed at or near the top end of the piston 70" and the primary seal 24" is disposed at or near the bottom end of the piston 70".

In use, the secondary container 200" is fitted to the dispensing piston 16" before the pressure chamber 14" is closed (e.g., while the bottom plate 44" is removed). In the illustrated embodiment, the secondary container 200" is a mix cup, such as a 1200 mL (40 oz) mix cup, that is fitted onto the dispensing piston 16" from below. The system 10 can be scaled to work with secondary containers of alternative sizes and shapes. When installed, the dispensing piston 16" interfaces with the interior surface of circumferential wall of the mix cup 200". As shown in FIG. 13A, the primary seal 24" provides a leaktight seal between the outer surface of the dispensing piston 16" and the inner surface of the circumferential wall of the mix cup 200", and the guide ring 440 interfaces with the circumferential wall of the mix cup 200" in spaced relation to the primary seal 24" to provide two regions of contact that cooperatively resist canting of the mix cup 200" relative to the dispensing piston 16". Once the secondary container 200" is fitted to the dispensing piston 16", the bottom plate 44" of the pressure chamber 14" can be installed and secured by threaded rods 48" and attachment knobs 60" to enclose the secondary container 200" within the pressure chamber 14". The dispensing container 202" is installed on the piston 70". For example, in this embodiment, the dispensing container 202" is a 12 oz cartridge with internal piston and it is threadedly installed on the fitting 434, thereby establishing a flow path from the interior space 20" to the interior of the dispensing container 202". FIG. 13A shows the secondary container 200" and the dispensing container 202" installed on the fluid transfer system 10. To transfer material from the secondary container 200" into the dispensing container 202", pressurized air is introduced into the interior space 20" through the air fitting in the bottom plate 44". Pressurized air moves the secondary container 200" increasingly farther onto the dispensing piston 16", which in turn causes material to flow from within the secondary container 200" into the dispensing container 202".

When a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. An apparatus for moving high viscosity fluid from a secondary container to a dispensing container comprising:

a pressure chamber defining an interior space, the interior space being configured to receive and fully enclose the secondary container, the pressure chamber configured to be selectively pressurized;

a dispensing piston extending into the interior space, the dispensing piston configured to seat the mouth of the secondary container, the dispensing piston including a seal configured to engage with an inner surface of the secondary container, the dispensing piston having a first surface facing an interior of the pressure chamber and a second surface facing an exterior of the pressure chamber, the dispensing piston defining a material outlet extending from the first surface to the second surface; and a dispensing container seat configured to receive the dispensing container, the dispensing container seat being in fluid communication with the material outlet, whereby material moving from the secondary container through the material outlet flows into the dispensing container seated on the dispensing container seat; and wherein adequate pressurization of the pressure chamber forces the secondary container to move increasingly farther onto the dispensing piston thereby moving material inside secondary container through the material outlet and into the dispensing container seated on the dispensing container seat.

2. The apparatus of claim 1 wherein the pressure chamber includes a top plate, a bottom plate and a wall disposed between the top plate and the bottom plate.

3. The apparats of claim 2 wherein the bottom plate includes a door providing selective access to the interior of the pressure chamber.

4. The apparatus of claim 1 wherein the dispensing piston includes a wall and a secondary container adapter, the secondary container adapter being configured to seat the secondary container, the primary seal extending around the secondary container adapter to provide a seal between the secondary container adapter and the secondary container seated on the dispensing piston.

5. The apparatus of claim 4 wherein the dispensing piston include a circumferential wall and the secondary container adapter closes one open end of the circumferential wall.

6. The apparatus of claim 5 wherein the secondary container adapter has a stepped configuration with a neck having an outer diameter less than an inner diameter of the circumferential wall and a shoulder with an outer diameter greater than an inner diameter of the circumferential wall, the secondary container adapter position with the neck extending into the circumferential wall and shoulder that disposed outside the circumferential wall.

7. The apparatus of claim 6 wherein the pressure chamber includes a top plate; and wherein the circumferential wall is joined to the top plate.

8. The apparatus of claim 1 wherein the pressure chamber includes a plurality of guide pins disposed in spaced apart relationship from the dispensing piston.

9. The apparatus of claim 8 further including a dispensing container adapter, the dispensing container adapter being joined to the dispensing piston, the dispensing container adapter defining the material outlet.

10. The apparatus of claim 8 further including a plurality of interchangeable dispensing container adapters, each of the dispensing container adapters being alternatively joinable to the dispensing piston, each of the dispensing container adapters defining a through-hole forming the material outlet when joined to the dispensing piston.

11. The apparatus of claim 9 wherein the circumferential wall of the dispensing piston defines an internal space adjacent to the dispensing container adapter, the internal space configured to receive the dispensing container seated on the dispensing container adapter.

12. The apparatus of claim 1 further including a pressure valve and a pressure regulator, the pressure valve being selectively operable to control a supply of pressurized air to the pressure chamber, the pressure regulator being selectively adjustable to vary a pressure of a pressurized air supplied to the pressure chamber.

13. The apparatus of claim 1 wherein the pressure chamber includes a plurality of guide pins disposed in spaced apart relationship from the dispensing piston, the top plate defining a plurality of sets of guide pin openings configured to allow the plurality of guide pins to installed in different mounting pattern that accommodate different secondary containers.

14. A method of operating an apparatus in accordance with claim 1 to transfer fluid from the secondary container to the dispensing container.

15. A fluid apparatus for transferring highly viscous material comprising:

a pressure chamber defining an interior space, the pressure chamber having a door providing selective access to the interior space;

a dispensing piston extending into the interior space, the dispensing piston having an inner end configured to seat the mouth of a secondary container, the dispensing piston includes a primary seal configured to engage with an inner surface of the secondary container; and a dispensing container adapter joined to the dispensing piston, the dispensing container adapter configured to receive a dispensing container, the dispensing container defining a material outlet; and wherein pressurization of the pressure chamber forces the secondary container seated on the dispensing piston to move increasingly farther onto the dispensing piston thereby moving material inside the secondary container through the material outlet and into the dispensing container seated on the dispensing container adapter.

16. The apparatus of claim 15 wherein the dispensing piston includes a circumferential wall and a secondary container adapter, the secondary container adapter forming the inner end of the dispensing piston, the primary seal being fitted about the secondary container adapter.

17. The apparatus of claim 16 wherein the dispensing container adapter has a first surface facing an interior of the pressure chamber and a second surface facing an exterior of the pressure chamber, the dispensing container adapter being removably joined to the dispensing container adapter with the material outlet providing a material flow path from the interior of the pressure chamber to the exterior of the pressure chamber.

18. The apparatus of claim 17 wherein the dispensing container adapter is disk-shaped and has a stepped configuration with a neck fitted into the circumferential wall and a shoulder disposed outside the circumferential wall.

19. The apparatus of claim 15 wherein the dispensing piston includes a plurality of interchangeable secondary container adapters, each of the secondary container adapters being configured to be interfitted with different secondary containers.

20. The apparatus of claim 15 wherein the dispending piston include a plurality of interchangeable dispending container adapters, each of the dispensing container adapters being configured to be interfitted with different dispensing containers.

21. A method of moving highly viscous material from a secondary container to a dispensing container, comprising the steps of:

providing a pressure chamber with an internal dispensing piston and a dispensing container seat, the dispensing piston defining a material outlet in fluid communication with the dispensing container seat;

fitting the dispensing container onto the dispensing container seat;

seating the secondary container containing a material onto the dispensing piston within the pressure chamber;

introducing pressurized air into the pressure chamber such that force exerted by the pressurized air causes the secondary container to move increasingly farther onto the dispensing piston, whereby material within the secondary container is moved through the material outlet to the dispensing container.

22. An apparatus for moving high viscosity fluid from a secondary container with an internal piston to a dispensing container comprising:

a pressure chamber defining an interior space, the interior space being configured to receive and fully enclose the secondary container, the pressure chamber configured to be selectively pressurized;

a secondary container seat disposed inside the pressure chamber and configured to receive the secondary container having an internal piston, the secondary container seat configured to receive the secondary container in a position in which an internal piston is subject to pressure within the interior space;

a dispensing container seat disposed outside the pressure chamber and configured to receive the dispensing container; and a container adapter penetrating a wall of the pressure chamber and forming at least a portion of the secondary container seat and at least a portion of dispensing container seat, the container adapter having an inner end configured to adjoin with an outlet of the secondary container and an outer end configured to adjoin with an inlet of the dispensing container, the container adapter defining a material outlet extending entirely therethrough to define a material flow path from the inner end to the outer end; and wherein adequate pressurization of the pressure chamber applies a force to a piston in the secondary container seated on the secondary container seat to move material inside the secondary container through the material outlet and into the dispensing container seated on the dispensing container seat.

23. The apparatus of claim 22 further including an outer adapter operatively interfitted with a wall of the pressure chamber and a leaktight seal disposed between the outer adapter and the pressure chamber; and wherein the container adapter extends through the outer adapter.

24. The apparatus of claim 22 including a plurality of interchangeable container adapters, the plurality of container having different inner and outer ends configured to adjoin with different secondary containers or different dispensing containers.

* * * * *